US010634759B2

(12) United States Patent
Kim et al.

(10) Patent No.: US 10,634,759 B2
(45) Date of Patent: Apr. 28, 2020

(54) METHOD FOR ESTIMATING LOCATION, AND ELECTRONIC DEVICE AND SERVER THEREOF

(71) Applicant: Samsung Electronics Co., Ltd., Gyeonggi-do (KR)

(72) Inventors: Jin-Woo Kim, Seoul (KR); Seok-Hwan Park, Gyeonggi-do (KR); Sung-Rae Cho, Gyeonggi-do (KR); Chae-Man Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 547 days.

(21) Appl. No.: 14/966,828

(22) Filed: Dec. 11, 2015

(65) Prior Publication Data

US 2016/0170004 A1 Jun. 16, 2016

(30) Foreign Application Priority Data

Dec. 12, 2014 (KR) ........................ 10-2014-0179404

(51) Int. Cl.
*G01S 5/00* (2006.01)
*G01S 5/02* (2010.01)
(Continued)

(52) U.S. Cl.
CPC .......... *G01S 5/0036* (2013.01); *G01S 5/0242* (2013.01); *G01S 5/06* (2013.01); *G01S 5/14* (2013.01);
(Continued)

(58) Field of Classification Search
CPC ..... H04W 64/00; H04W 4/02; H04W 64/006; H04W 24/10; H04W 4/023; H04W 4/029;
(Continued)

(56) References Cited

U.S. PATENT DOCUMENTS 6,282,427 B1 * 8/2001 Larsson .................... G01S 1/04
342/450
6,750,812 B2 * 6/2004 Mizugaki ............... G01C 21/20
342/357.4

(Continued)

FOREIGN PATENT DOCUMENTS

CN 101087470 12/2007
CN 101193423 6/2008
(Continued)

OTHER PUBLICATIONS

European Search Report dated May 11, 2016 issued in counterpart application No. 15199225.2-1812, 8 pages.
(Continued)

*Primary Examiner* — Olumide Ajibade Akonai
(74) *Attorney, Agent, or Firm* — The Farrell Law Firm, P.C.

(57) ABSTRACT

A method for estimating location of an electronic device is provided. The method includes collecting from a transmitter, transmitter information including time information that is proportional to distance between the electronic device and the transmitter; obtaining location information of the electronic device at a point where the transmitter information is collected; and transmitting the transmitter information and the location information to a server to be used to estimate the location of the transmitter.

24 Claims, 12 Drawing Sheets

(51) Int. Cl.
*G01S 5/06* (2006.01)
*G01S 5/14* (2006.01)
*H04W 64/00* (2009.01)
*H04W 4/029* (2018.01)
*H04W 4/02* (2018.01)

(52) U.S. Cl.
CPC ............ *H04W 4/025* (2013.01); *H04W 4/029* (2018.02); *H04W 64/00* (2013.01)

(58) Field of Classification Search
CPC .... H04W 4/025; G01S 5/0252; G01S 5/0236; G01S 5/14; G01S 19/48; G01S 5/0045; G01S 5/0242; G01S 5/0036; G01S 5/0226; G01S 5/10; G01S 19/05; G01S 19/25; G01S 19/42; G01S 5/0018; G01S 5/19; G01S 5/05; H04L 43/0864
USPC ..... 455/456.1–456.6, 414.1, 414.2, 457, 566
See application file for complete search history.

(56) References Cited

U.S. PATENT DOCUMENTS

| | | | |
|---|---|---|---|
| 8,219,116 | B1 | 7/2012 | Ji et al. |
| 2003/0119524 | A1* | 6/2003 | Carlsson ............... H04W 64/00 455/456.1 |
| 2006/0009235 | A1 | 1/2006 | Sheynblat et al. |
| 2007/0121560 | A1 | 5/2007 | Edge |
| 2010/0150117 | A1 | 6/2010 | Aweya et al. |
| 2010/0323723 | A1 | 12/2010 | Gerstenberger et al. |
| 2012/0028652 | A1* | 2/2012 | Wirola ................. G01S 5/0252 455/456.1 |
| 2012/0302258 | A1* | 11/2012 | Pai .......................... H04W 4/02 455/456.2 |
| 2013/0143589 | A1* | 6/2013 | Huang .............. H04W 52/0254 455/456.1 |
| 2013/0307723 | A1 | 11/2013 | Garin et al. |
| 2014/0066092 | A1* | 3/2014 | Scheim ............... H04W 64/006 455/456.1 |
| 2015/0257123 | A1* | 9/2015 | Bhuyan ............... H04W 64/006 455/456.1 |

FOREIGN PATENT DOCUMENTS

| | | |
|---|---|---|
| CN | 101541079 | 9/2009 |
| CN | 103139704 | 6/2013 |

OTHER PUBLICATIONS

Chinese Office Action dated Nov. 4, 2019 issued in counterpart application No. 201510919542.3, 28 pages.

* cited by examiner

|  | $TA_i$ | $rank(TA_i)$ | candidate point i | candidate point i+1 |  |
|---|---|---|---|---|---|
| first location | $TA_1$=3 | 2 | 50 (rank=2) | 100 (rank=3) | |
| second location | $TA_2$=5 | 3 | 90 (rank=3) | 50 (rank=2) | ... |
| third location | $TA_3$=2 | 1 | 40 (rank=1) | 20 (rank=1) | |
| | | | ⋮ | | |

FIG.9

METHOD FOR ESTIMATING LOCATION, AND ELECTRONIC DEVICE AND SERVER THEREOF

PRIORITY

This application claims priority under 35 U.S.C. § 119(a) to a Korean Patent Application filed in the Korean Intellectual Property Office on Dec. 12, 2014 and assigned Serial No. 10-2014-0179404, the entire content of which is incorporated herein by reference.

BACKGROUND

1. Field of the Disclosure

The present disclosure generally relates to an electronic device having a communication function, and more particularly, to a method and apparatus for estimating the location of a base station, which is used to determine the location of an electronic device.

2. Description of the Related Art

In recent years, electronic devices have been widely used based on their mobility. Electronic devices may support a variety of location based services (e.g., recommending restaurants in a certain area). To support location based services it is important to accurately measure the location of the electronic devices.

To determine the location of the electronic devices, the global positioning system (GPS) is generally used. However, since reception of the GPS signal is limited due to environmental obstacles such as indoor and urban obstacles, it may be difficult to GPS. Further, the location of the electronic devices may be determined based on the distances or angles from three or more base stations, or may be determined based on the strength of the signals transmitted by the base stations as measured by the receiving electronic devices.

A variety of ways to estimate electronic device location have been studied. However, the strength of the transmitted signals may vary or the minimum number of signals required to estimate the location may not be received from the base stations due to environmental obstacles and limited performance or resources within the electronic devices. Therefore, there is a need for a location estimation method that is not affected by the signal reception environment or performance.

SUMMARY

The present disclosure has been made to address at least the above disadvantages and other disadvantages not described above, and to provide at least the advantages described below.

According to an aspect of the present disclosure, a method is provided for estimating the location of an electronic device, the method including collecting transmitter information including time information that is proportional to the distance between the electronic device and the transmitter; obtaining location information of the electronic device for a point where the transmitter information is collected; and transmitting the transmitter information and the location information to a server so as to be used to estimate a location of the transmitter.

According to an aspect of the present disclosure, a method is provided for estimating a location in a server, the method including receiving transmitter information including time information that is proportional to a distance between an electronic device and a transmitter, and location information of the electronic device at the point where the transmitter information is collected; and estimating the location of the transmitter based on the time information and the location information.

According to an aspect of the present disclosure, an electronic device is provided including a cellular module configured to collect from a transmitter, transmitter information including time information that is proportional to the distance between the electronic device and the transmitter; a reception module configured to receive location information of the electronic device at a point where the transmitter information is collected; a memory configured to store a policy received from a server and including at least one of a criterion for collecting the transmitter information and a criterion for reporting to the server; a processor configured to transmit the transmitter information and the location information to the server to be used to estimate the location of the transmitter based on the policy; and a short-range communication module configured to transmit the transmitter information and the location information to the server.

BRIEF DESCRIPTION OF THE DRAWINGS

The above and other aspects, features and advantages of the present disclosure will be more apparent from the following detailed description taken in conjunction with the accompanying drawings, in which:

FIG. 9 illustrates the correlation between candidate points for each measurement location according to an embodiment of the present disclosure;

Throughout the drawings, like reference numerals will be understood to refer to like parts, components, and structures.

DETAILED DESCRIPTION

Figure 1:
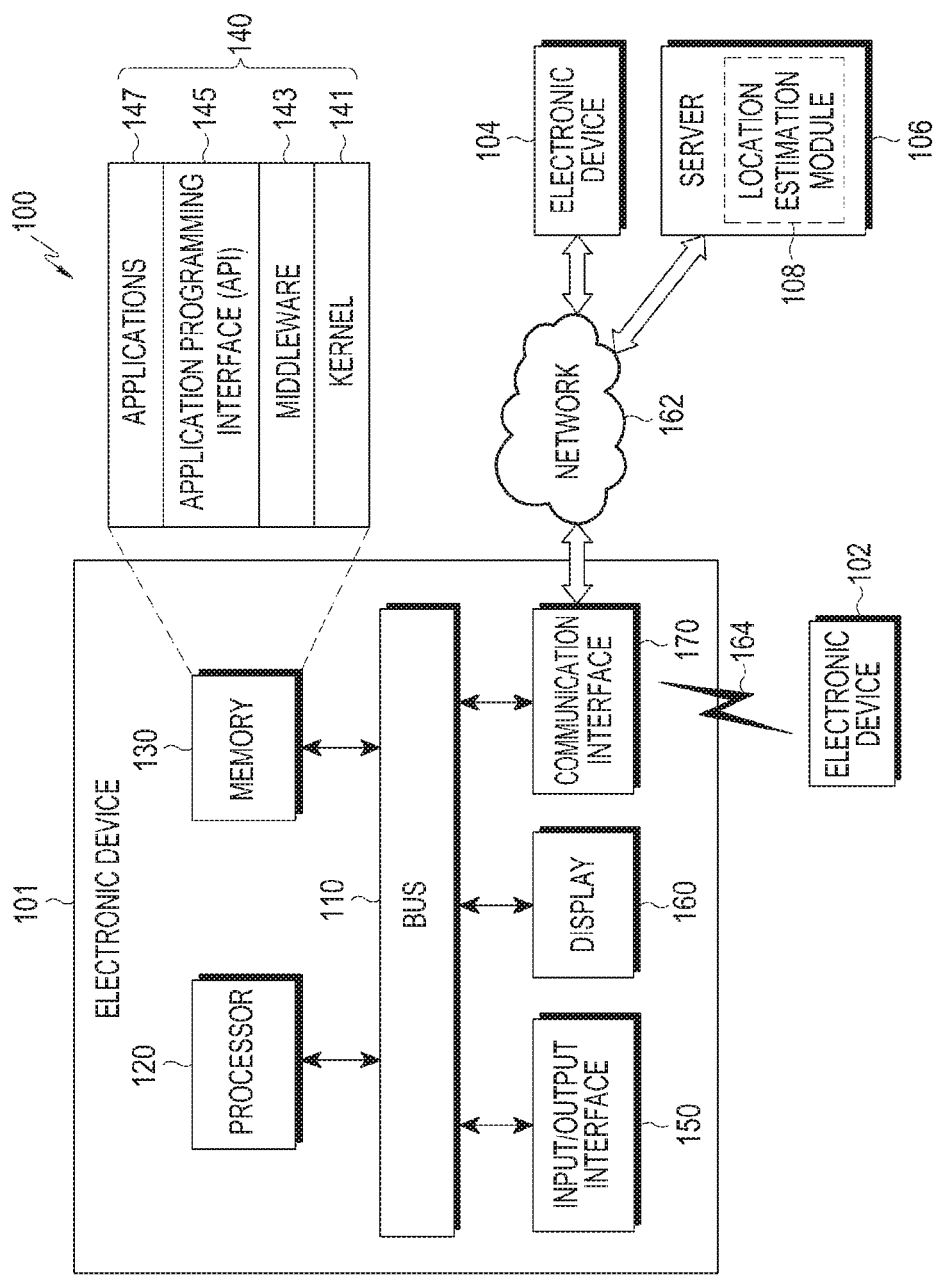
FIG. 1 illustrates a network environment including an electronic device according to an embodiment of the present disclosure.

Hereinafter, various embodiments of the present disclosure will be disclosed with reference to the accompanying drawings. However, the present disclosure is not intended to be limited to particular embodiments and it should be construed as including various modifications, equivalents, and/or alternatives according to the embodiments of the present disclosure. In regard to the description of the drawings, like reference numerals refer to like elements.

In the present disclosure, expressions such as "having," "may have," "comprising," "includes", "may include" or "may comprise" indicate the existence of a corresponding characteristic (such as an element, a numerical value, function, operation, or component) and do not exclude the existence of additional characteristics.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," as used herein may represent various elements regardless of order and/or importance and do not limit corresponding elements. The expressions may be used for distinguishing one element from another element. For example, a first user device and a second user device may represent different user devices regardless of order or importance. For example, a first element may be referred to as a second element without deviating from the scope of the present disclosure, and similarly, a second element may be referred to as a first element.

When it is described that an element (such as a first element) is "operatively or communicatively coupled" to or "connected" to another element (such as a second element), the element can be directly connected to the other element or can be connected to the other element through a third element. However, when it is described that an element (such as a first element) is "directly connected" or "directly coupled" to another element (such as a second element), it means that there is no intermediate element (such as a third element) between the element and the other element.

An expression "configured to (or set to)" used in the present disclosure may be replaced with, for example, "suitable for," "having the capacity to," "designed to," "adapted to," "made to," or "capable of" according to the situation. The term "configured to (or set to)" does not always mean "specifically designed to" by hardware. In some situations, an expression "apparatus configured to" may mean that the apparatus "can" operate together with another apparatus or component. For example, the phrase "a processor configured (or set) to perform A, B, and C" may be a general-purpose processor (such as a CPU or an application processor) that can perform a corresponding operation by executing at least one software program stored in a dedicated processor (such as an embedded processor) for performing a corresponding operation or in a memory device.

Terms defined in the present disclosure are used for only describing specific embodiments and are not intended to limit the scope of other embodiments. When used in a description of the present disclosure and the appended claims, a singular form may include a plurality of forms unless it is explicitly differently represented. Entire terms including a technical term and a scientific term used here may have the same meaning as a meaning that may be generally understood by a person of common skill in the art. Terms defined in general dictionaries among terms used herein have the same meaning as or a meaning similar to that of a context of related technology and are not defined as an ideal or excessively formal meaning unless explicitly defined. In some cases, terms defined in the present disclosure cannot be defined as to exclude the present exemplary embodiments.

An electronic device according to an embodiment of the present disclosure may be a device with a communication function. The electronic device 101 may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device (e.g., smart glasses, a head mounted device (HMD), electronic clothing, an electronic bracelet, an electronic necklace, an electronic App accessory (or appcessory), electronic tattoo, a smart mirror, or a smart watch.).

According to an embodiment of the present disclosure, the electronic device may be a smart home appliance with the communication function. The smart home appliance may include at least one of a television (TV), a digital video disk (DVD) player, an audio player, a refrigerator, an air conditioner, a cleaner, an oven, a microwave oven, a washer, an air purifier, a set-top box, a home automation control panel, a security control panel, a TV box (e.g., a Samsung Home-Sync™, an Apple TV™, or a Google TV™), a game console (e.g., Xbox™ or PlayStation™), an electronic dictionary, an electronic key, a camcorder or a digital photo frame.

According to an embodiment of the present disclosure, the electronic device may include at least one of various medical devices with the communication function (e.g., various portable medical meters (e.g., a blood glucose meter, a heart rate meter, a blood pressure meter, a temperature meter and the like), magnetic resonance angiography (MRA), magnetic resonance imaging (MRI), computed tomography (CT), a medical camcorder, an ultrasonic device and the like), a navigation device, a global positioning system (GPS) receiver, an event data recorder (EDR), a flight data recorder (FDR), an automotive infotainment device, a marine electronic device (e.g., a marine navigation device, a gyro compass and the like), avionics, a security device, a car head unit, an industrial or home robot, an automatic teller machine (ATM) for banks, point of sales terminals (POS) for shops, or an Internet of Things (IoT) device (e.g., a light bulb, various sensors, an electricity or gas meter, a sprinkler device, a fire alarm, a thermostat, a streetlamp, a toaster, fitness equipment, a hot-water tank, a heater, a boiler and the like).

According to an embodiment of the present disclosure, the electronic device 101 may include at least one of a part of the furniture or building/structure, an electronic board, an electronic signature receiving device, a projector, or various meters (e.g., meters for water, electricity, gas or radio waves), each of which includes a communication function. According to an embodiment of the present disclosure, the electronic device may be one or a combination of the above-described devices and may be a flexible electronic device. An electronic device according to an embodiment of the present disclosure will not be limited to the above-described devices, and may include new electronic devices according to the development of new technologies.

An electronic device according to an embodiment of the present disclosure will be described with reference to the accompanying drawings. As used herein, the term 'user' may refer to a person who uses the electronic device, or a device (e.g., an artificial intelligence electronic device) that uses the electronic device.

Further, it will be apparent to those skilled in the art that an electronic device or device according to an embodiment of the present disclosure is not limited to the above-mentioned devices.

FIG. 1 illustrates a network environment including an electronic device according to an embodiment of the present disclosure.

Referring to FIG. 1, an electronic device 101 in a network environment 100 in an embodiment of the present disclosure will be described. The electronic device 101 includes a bus 110, a processor 120, a memory 130, an input/output (I/O) interface 150, a display 160 and a communication interface 170. In particular embodiments, the electronic device 101 may exclude any one of the components, or may further include other components.

The bus 110 may include, for example, a circuit that connects the components 120 to 170 to each other, and transfers the communication (e.g., a control message and/or data) between the components 120 to 170.

The processor 120 may include one or more of a central processing unit (CPU), an application processor (AP) or a communication processor (CP). The processor 120 may execute a control and/or communication-related operation or data processing for at least one other component of the electronic device 101. The processor 120 may be referred to as a controller, or may include the controller as a part thereof.

The processor 120 according to an embodiment of the present disclosure may collect, from a transmitter, transmitter information including time information that is proportional to the distance between the electronic device 101 and the transmitter, and obtain location information of the electronic device 101 at a point where the transmitter information is collected. The transmitter information may refer to base station 300 identification information, cell information and the like. The time information may be timing advance (TA) provided by the base station 300.

The processor 120 may be configured to transmit the transmitter information and the location information to be used to estimate the location of the transmitter in a server 106. The processor 120 may collect the transmitter information and the location information based on a policy provided by the server 106, and transmit the collected information to the server 106 based on the policy.

The memory 130 may include a volatile and/or non-volatile memory. The memory 130 may store a command or data related to at least one other component of the electronic device 101. The memory 130 may store software and/or a program 140. The program 140 may include a kernel 141, a middleware 143, an application programming interface (API) 145, and/or an application program (or application) 147. At least some of the kernel 141, middleware 143 or the API 145 may be referred to as an operating system (OS). The memory 130 may store the policy provided by the server 106, and the policy may include at least one of a criterion for collecting the transmitter information and a criterion for reporting the collected information to the server 106.

The kernel 141 may control or manage the system resources (e.g., the bus 110, the processor 120, the memory 130 and the like) that are used to execute the operation or function implemented in other programs (e.g., the middleware 143, the API 145, the application program 147 and the like). Further, the kernel 141 may provide an interface by which the middleware 143, the API 145 or the application program 147 can control or manage the system resources by accessing the individual components of the electronic device 101.

The middleware 143 may perform an intermediary role so that the API 145 or the application program 147 may exchange data with the kernel 141 by communicating with the kernel 141. Further, with respect to the task requests received from the application program(s) 147, the middleware 143 may perform control (e.g., scheduling or load balancing) for the work requests by using a method of assigning a priority capable of using the system resources (e.g., the bus 110, the processor 120, the memory 130 and the like) of the electronic device 101 to at least one of the application programs 147.

The API 145 is an interface by which the application 147 controls the function provided in the kernel 141 or the middleware 143, and may include at least one interface or function (e.g., a command) for file control, window control, image processing or character control.

The I/O interface 150 may serve as an interface that can transfer a command or data received from the user or other external device to the other components 110, 120, 130, 140, 160 and 170 of the electronic device 101. Further, the I/O interface 150 may output a command or data received from the other components 110, 120, 130, 140, 160 and 170 of the electronic device 101, to the user or other external devices.

The display 160 may include a liquid crystal display (LCD) display, a light emitting diode (LED) display, an organic light emitting diode (OLED) display, a microelectromechanical systems (MEMS) display, or an electronic paper display. The display 160 may display a variety of content (e.g., text, images, videos, icons, symbols and the like), for the user. The display 160 may include a touch screen, and may receive a touch input, a gesture input, a proximity input or a hovering input made by an electronic pen or a part of the user's body.

The communication interface 170 may establish communication between the electronic device 101 and an external device, such as a first external electronic device 102, a second external electronic device 104 or server 106. For example, the communication interface 170 may communicate with the second external electronic device 104 or the server 106 by being connected to a network 162 by wireless communication or wired communication. Further, the communication interface 170 may establish communication with the external device, the first external electronic device 102 through short-range wireless communication 164, and may be connected to the external device, second external electronic device 104 through the short-range wireless communication 164 instead of the network 162. For the short-range wireless communication, at least one of beacon, WiFi Direct, WiFi, Bluetooth, non-visible light, baseband, or audible/non-audible frequency may be used.

The wireless communication may include at least one of long term evolution (LTE), long term evolution-advanced (LTE-A), code division multiple access (CDMA), wideband code division multiple access (WCDMA), universal mobile telecommunication system (UMTS), wireless broadband (WiBro) or global system for mobile communication (GSM), as a cellular communication protocol. The wired communication may include at least one of, for example, universal serial bus (USB), high definition multimedia interface (HDMI), recommended standard 232 (RS-232) or plain old telephone service (POTS). The network 162 may include a telecommunications network at least one of the computer network (e.g., a local area network (LAN) or a wide area network (WAN)), the Internet or the telephone network.

Each of the first and second external electronic devices 102 and 104 may be a device that is the same as or different from the electronic device 101. In a particular embodiment, the server 106 may include a group of one or more servers.

In an embodiment of the present disclosure, all or some of the operations executed in the electronic device 101 may be executed in one or multiple other electronic devices. In one embodiment, if the electronic device 101 should perform a certain function or service automatically or upon request, the electronic device 101 may request at least some of the functions related thereto from other electronic devices 102 and 104, or the server 106, instead of or in addition to the electronic device 101 executing the function or service. The other electronic devices may execute the requested function or additional function, and deliver the results to the electronic device 101. The electronic device 101 may process the received results intact or additionally, thereby providing the requested function or service. To this end cloud computing, distributed computing, or client-server computing technology may be used.

In an embodiment of the present disclosure, the server 106 includes a location estimation module 108 capable of collecting the information required to estimate the location of a transmitter (e.g., a base station). The location estimation module 108 may estimate the location of the base station based on the collected information that is provided from the electronic device 101 based on an algorithm for estimating the location of the base station. A detailed operation of the server 106 will be described below. Although the transmitter will be assumed as a base station in the following description, the transmitter may not be limited to a base station as long as it can provide the information that is proportional to the distance between the transmitter and the electronic device 101.

Figure 2:
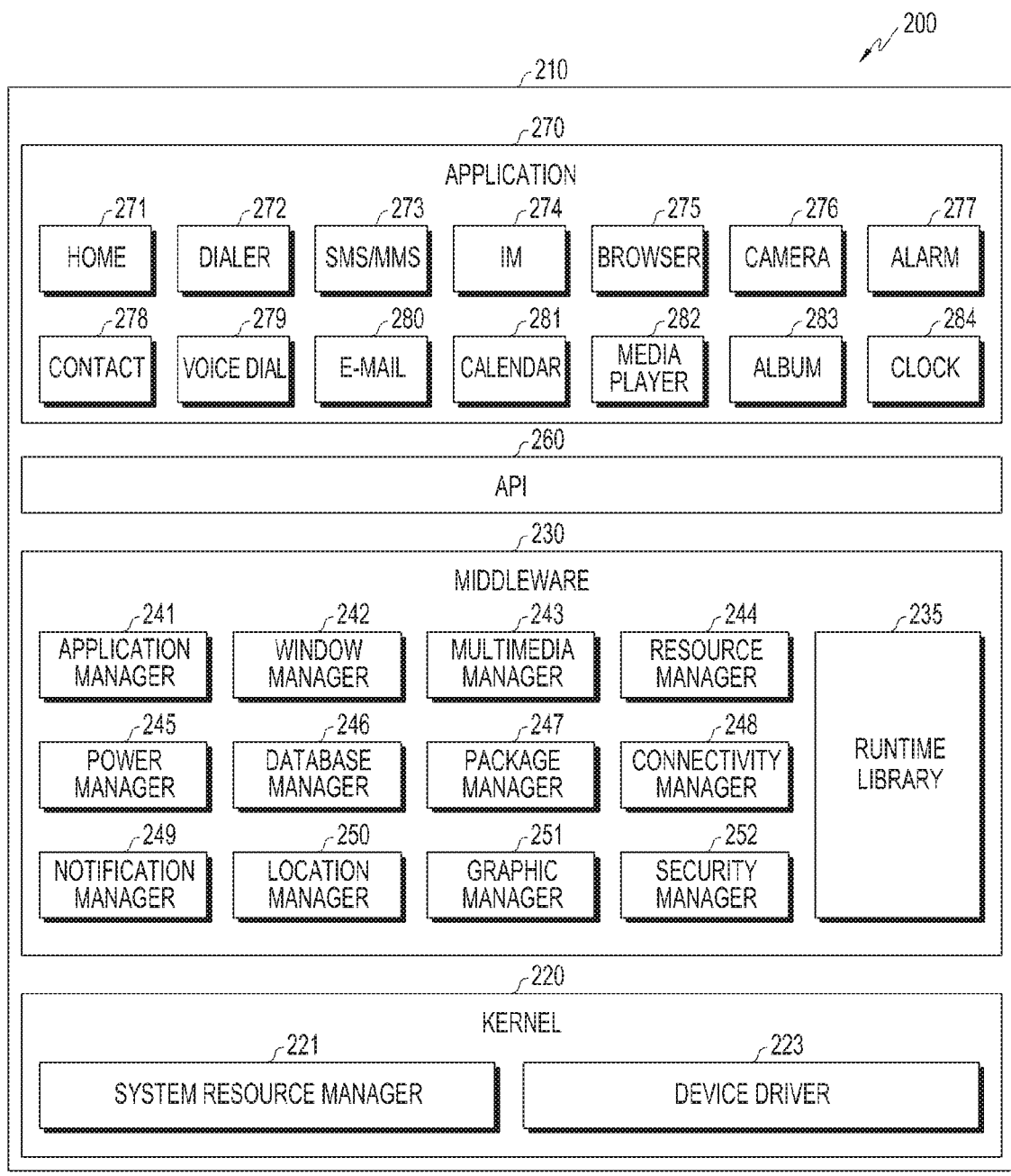
FIG. 2 is a block diagram of a program module according to an embodiment of the present disclosure.

FIG. 2 is a block diagram 200 of a program module 210 according to an embodiment of the present disclosure. In a particular embodiment, the program module 210 (e.g., the program 140) may include the operating system (OS) for controlling the resources related to an electronic device (e.g., the electronic device 101) and/or various applications (e.g., the application program 147) that are run on the operating system. The operating system may be Android™, iOS™, Windows™, Symbian™, Tizen™, Bada™ and the like.

The program module 210 may include a kernel 220, a middleware 230, an API 260, and/or an application(s) 270. At least a part of the program module 210 may be preloaded on the electronic device, or downloaded from a server 106.

The kernel 220 (e.g., the kernel 141 in FIG. 1) includes, for example, a system resource manager 221 or a device driver 223. The system resource manager 221 may control, allocate or recover the system resources. In a particular embodiment, the system resource manager 221 may include a process manager, a memory manager, a file system manager and the like. The device driver 223 may include, for example, a display driver, a camera driver, a Bluetooth driver, a shared memory driver, a USB driver, a keypad driver, a wireless fidelity (WiFi) driver, an audio driver, or an inter-process communication (IPC) driver.

The middleware 230 provides a function that is required by the application(s) 270, or provides various functions to the application 270 through the API 260 so that the application 270 may efficiently use the limited system resources within the electronic device 101. In a particular embodiment, the middleware 230 (e.g., the middleware 143) includes at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, or a security manager 252.

The runtime library 235 may include a library module that a compiler uses to add a new function through a programming language while the application 270 is run. The runtime library 235 may perform an I/O management function, a memory management function, an arithmetic function and the like.

The application manager 241 may manage the life cycle of at least one of the application(s) 270. The window manager 242 may manage graphic user interface (GUI) resources that are used on the screen. The multimedia manager 243 may determine the format required for playback of various media files, and encode or decode the media files using a codec for the format. The resource manager 244 may manage resources such as source code, memory or storage space for any one of the application(s) 270.

The power manager 245 may manage the battery or power by operating with the basic input/output system (BIOS), and provide power information required for operation of the electronic device 101. The database manager 246 may create, search or update the database that is to be used by at least one of the application(s) 270. The package manager 247 may manage installation or update of applications that are distributed in the form of a package file.

The connectivity manager 248 may manage wireless connection such as, for example, WiFi or Bluetooth. The notification manager 249 may display or notify events such as message arrival, appointments and proximity in a manner that doesn't interfere with the user. The location manager 250 may manage the location information of the electronic device 101. The graphic manager 251 may manage the graphics effect to be provided to the user, or the related user interface. The security manager 252 may provide various security functions required for the system security or user authentication. In a particular embodiment, if the electronic device 101 includes a phone function, the middleware 230 may further include a telephony manager for managing the voice or video call function of the electronic device 101.

The middleware 230 may include a middleware module that forms a combination of various functions of the above described components. The middleware 230 may provide a module specialized for each type of operating system in order to provide a differentiated function. Further, the middleware 230 may dynamically remove some of the existing components, or add new components.

The API 260 (e.g., the API 145) is a set of API programming functions and may be provided in a different configuration depending on the operating system. For example, for Android™ or iOS™, the API 260 may provide one API set per platform, and for Tizen™, the API 260 may provide two or more API sets per platform.

The application 270 (e.g., the application program 147) includes one or more applications capable of providing functions such as a home 271, a dialer 272, a short message service/multimedia messaging service (SMS/MMS) 273, an instant message (IM) 274, a browser 275, a camera 276, an alarm 277, a contact 278, a voice dial 279, an Email 280, a calendar 281, a media player 282, an album 283, a clock 284, healthcare (e.g., for measuring the quantity of exercise, blood glucose level and the like), or environmental information (e.g., for providing information about the atmospheric pressure, the humidity, temperature and the like).

In a particular embodiment, the application 270 may include an application (hereinafter, referred to as an 'information exchange application' for supporting information exchange between the electronic device 101 and external electronic devices 102 and 104. The information exchange application may include a notification relay application for delivering specific information to the external electronic devices, or a device management application for managing the external electronic devices.

For example, the notification relay application may include a function for delivering notification information generated in other applications (e.g., an SMS/MMS application, an Email application, a healthcare application, an environmental information application and the like) of the electronic device to the external electronic devices 102 and 104. Further, the notification relay application may receive notification information from an external electronic device, and provide the received notification information to the user. The device management application may manage at least one function (e.g., the function of powering on the external electronic device itself (or some components thereof)) or the brightness or the resolution of the display of the external electronic device 102 and 104 communicating with the electronic device 101, and may manage (e.g., install, delete or update) an application operating in the external electronic device or a service (e.g., a call service or a messaging service) provided in the external electronic device.

In a particular embodiment, the application 270 may include an application (e.g., a healthcare application) that is specified depending on the attributes of the external electronic device 102 and 104. In a particular embodiment, the application 270 may include an application received or downloaded from server 106 or the electronic devices 102 and 104. In a particular embodiment, the application 270 may include a preloaded application or a third party application that can be downloaded from the server. The names of the components of the program module 210 shown in FIG. 2 may vary depending on the type of operating system.

In an embodiment of the present disclosure, at least a part of the program module 210 may be implemented by software, firmware, hardware or a combination thereof. At least a part of the program module 210 may be implemented (e.g., executed) by a processor (e.g., the processor 120). At least a part of the program module 210 may include a module, a program, a routine, an instruction set or a processor, for performing one or more functions.

Figure 3:
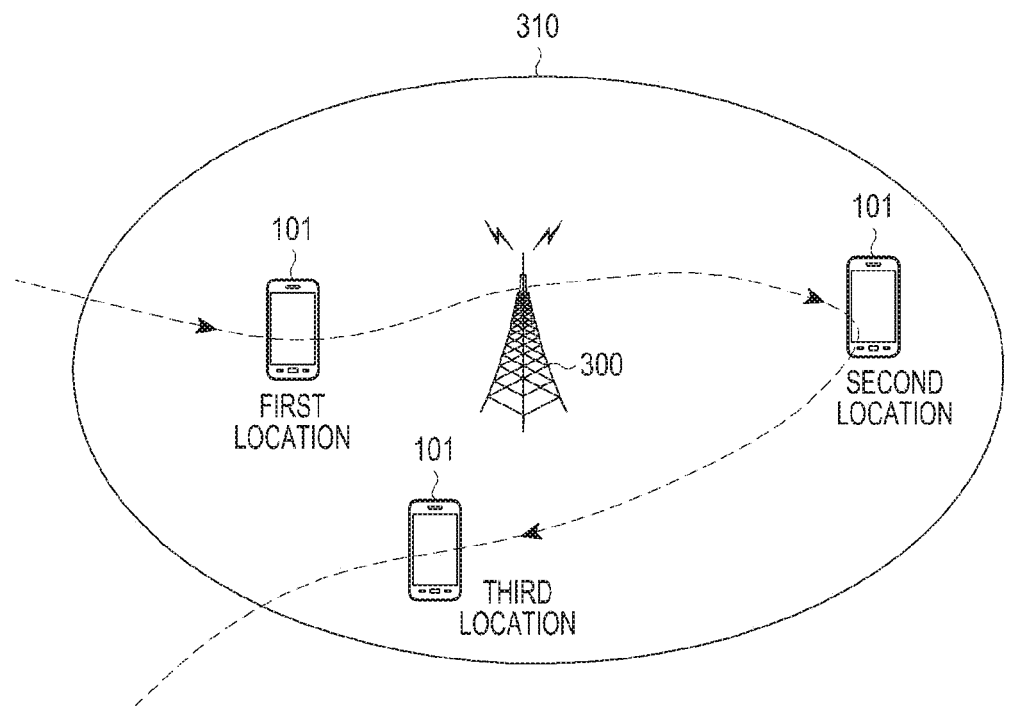
FIG. 3 illustrates the movement of an electronic device within a cell controlled by a base station according to an embodiment of the present disclosure.

FIG. 3 illustrates the movement of an electronic device within a cell controlled by a base station 300 according to an embodiment of the present disclosure. It is assumed in FIG. 3 that a base station 300 is given as an example of a transmitter that an electronic device 101 accesses to receive mobile communication services. In an embodiment of the present disclosure, the electronic device 101 may collect the information that proportionally indicates the distance between the base station 300 and the electronic device 101, provided from the base station 300.

Although the transmitter is assumed as the base station 300 in the example of FIG. 3, the transmitter may not be limited to the base station 300 as long as it can provide the information that is proportional to the distance between the transmitter and the electronic device 101. For example, the transmitter may be referred to as an access point (AP), a node B, a beacon or other terms, in addition to the fixed base station 300 communicating with the electronic device 101. Further, the cell may be referred to as a base station 300 and/or coverage area depending on the context where the term is used. The base station 300 may have a coverage area of various sizes and shapes that can be determined by various factors such as terrain and obstacles.

Referring to FIG. 3, in a cell area 310 controlled by the base station 300, the electronic device 101 may transmit/receive data through the base station 300 while moving from a first location to a third location via a second location, or may perform data transmission/reception through the base station 300 while staying in at least one of the first to third locations. In the case where the cell area 310 is covered by a third generation partnership project (3GPP) LTE system, the electronic device 101 may receive a mobile communication service by means of the base station 300 of the cell, to which the electronic device 101 has made a connection.

In an embodiment of the present disclosure, the coordinates of the base station 300 that manages the cell area 310, in which the electronic device 101 is known to be located, may be used as a reference location for location estimation by the electronic device 101. Although the coordinates of the base station 300 do not include the geographic location of the electronic device 101, the coordinates may be used for the location estimation by the electronic device 101. To obtain the coordinates of the base station 300, the information that proportionally indicates a distance between the base station 300 and the electronic device 101, provided from the base station 300, may be used in particular embodiments of the present disclosure.

To obtain the information, the electronic device 101 may communicate with the base station 300 on the downlink and/or uplink at a given time. A detailed operation for communication with the base station 300 will be described with reference to FIG. 4.

Figure 4:
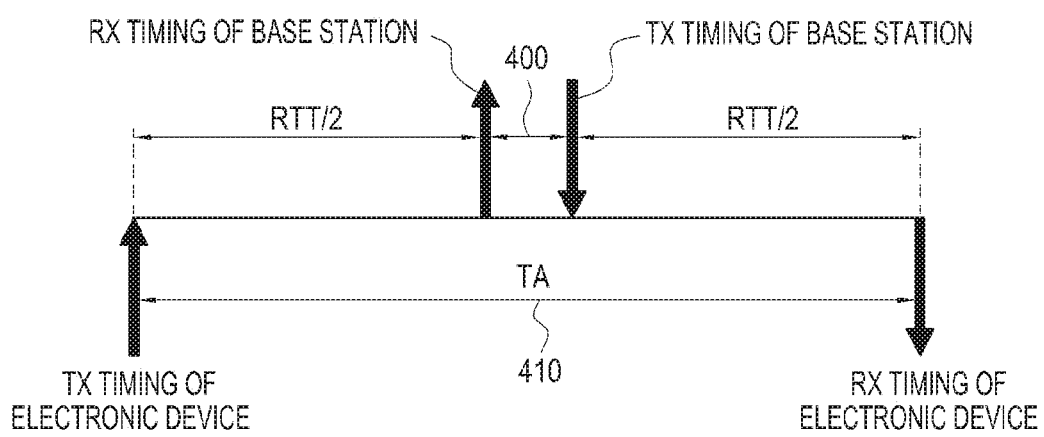
FIG. 4 illustrates signal delay between a base station and an electronic device according to an embodiment of the present disclosure.

FIG. 4 illustrates signal delay between a base station and an electronic device according to an embodiment of the present disclosure.

As shown in FIG. 4, the electronic device 101 may upload data at a predetermined transmission (Tx) timing (i.e., at an uplink transmission time), and the base station 300 may receive data at a base station's reception (Rx) timing by a propagation delay between the base station 300 and the electronic device 101 and then transmit data after a delay time 400 in the base station 300.

In an LTE system, timing advance (TA) 410 is defined as a time difference between the uplink transmission time and the downlink reception time of the electronic device 101, and the electronic device 101 may receive a TA value (0, 1, 2, . . . , 1282) from the base station 300 through a control channel. As shown in FIG. 4, the TA 410 may be a value obtained by adding the signal transmission/reception delay 400 in the base station 300 to the round trip time (RTT). Since the base station's Tx timing is determined by the base station 300 considering its situation, the electronic device 101 may not know the propagation delay time 400 that is added to the RTT. However, though the TA may not be converted into RTT, the TA may have a proportional relationship with the distance between the location (desired to be estimated) of the base station 300 and the location of the electronic device 101, the proportional relationship given by defining the propagation delay time defined as an offset. Therefore, in an embodiment of the present disclosure, time information that is proportional to the distance between the electronic device 101 and the base station 300 may be used in estimating the location of the base station 300, and the time information may include TA.

Figure 5:
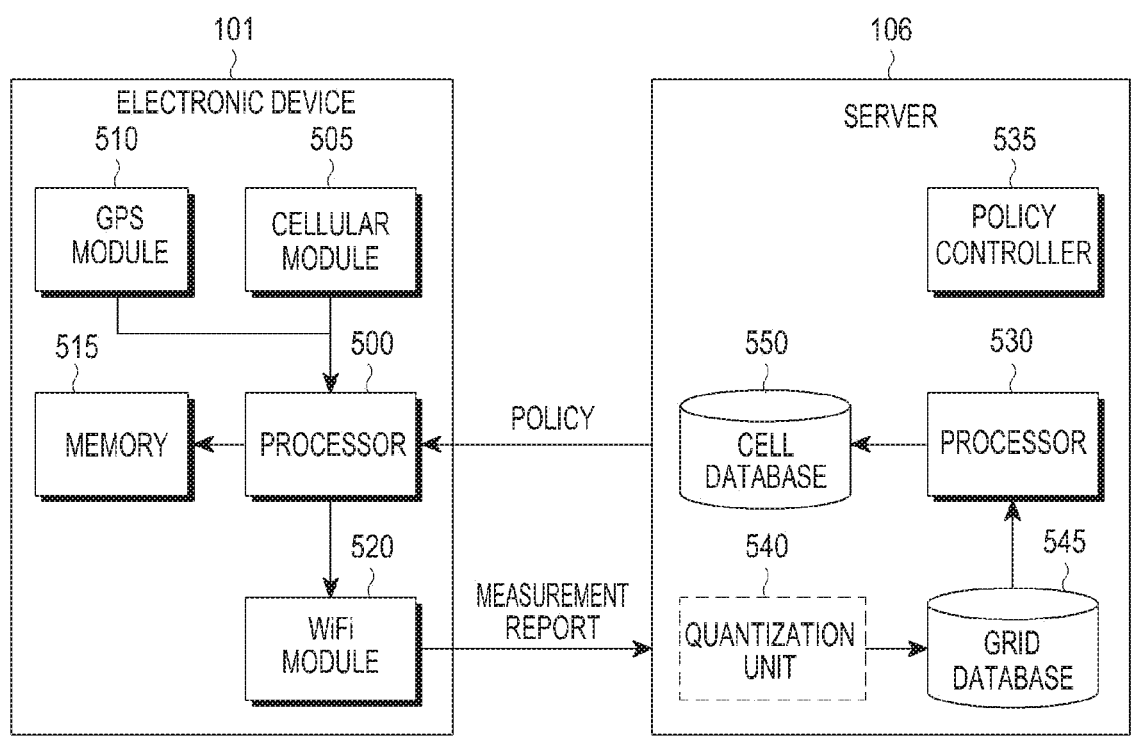
FIG. 5 is an internal block diagram of an electronic device and a server according to an embodiment of the present disclosure.

FIG. 5 is an internal block diagram of each of an electronic device and a server according to an embodiment of the present disclosure.

Referring to FIG. 5, the electronic device 101 includes components for collecting information used to estimate the location of the base station 300 and reporting the collected information. For this purpose, the electronic device 101 includes at least one of a processor 500, a cellular module 505, a GPS module 510, a memory 515 and a WiFi module 520.

The cellular module 505 of the electronic device 101 may provide a mobile communication service through the base station 300 of the LTE system, and receive through the base station 300, the network information such as an ID of the base station 300 and the measurement information obtained by the base station 300. The network information may include a mobile country code (MCC), a mobile network code (MNC), a tracking area code (TAC), an E-UTRAN cell identifier (GCID), a physical cell identifier (PCID), an E-UTRAN cell identifier (EARFCN) and the like. The measurement information may include a received signal strength indicator (RSSI), a reference signal received power (RSRP), TA and the like.

The GPS module 510 may receive location information for the electronic device 101 from the GPS satellites. The location information may include at least one of a GPS longitude, a GPS latitude, a GPS altitude and a GPS accuracy.

The memory 515 may store a policy provided from the server 106. The policy may include at least one of a criterion for collecting from the server 106 the information required to estimate the location of the base station 300, and a criterion for reporting the collected information to the server 106. At least one parameter included in the policy may be illustrated as shown in Table 1 below.

TABLE 1

| Element | |
|---|---|
| nextPolicyUpdate | The time interval (unit is day) for electronic device to ask for new version of policy from server. If this field is empty, the default value (1 month) should be used |
| dbCollection | 0: Non-collect, 1: Cell DB collect, 2: WiFi DB collect, 3: Cell/WiFi DB collect |
| neighborCellInfo | (To CP) 0: without neighboring cell info, 1: with neighboring cell info |
| minReportInterval | The minimum time which an electronic device has to wait until the next report after the latest one |
| maxReportInterval | The maximum time which an electronic device can wait without reporting |
| valuableThreshold | (To CP) report according to data value even though it doesn't reach maxReportInterval 0x00 All, 0x01 Targetcell/TA, 0x02 valid timing advance, 0x03 Targetcell/TA + valid timing advance |
| sizeOfMemory | The maximum number of measurement elements which can be stored in memory |
| primaryServerAddress | Server address (dns type) |
| secondaryServerAddress | Server address (dns type) – for/cells api, this address can be used. If it doesn't exist, primaryServerAddress should be used |
| forcedGPS | CP-based GPS fix is possible, 0: no forcedGPS, 1: with forcedGPS |
| targetTrackingArea | (To CP) when it comes across targetTrackingArea, set priority high to make data reported |
| targetCell | (To CP) when it comes across targetCell, set priority high to make data reported |
| measurement- | Collection request info (bit-map table from request |

TABLE 1-continued

| Element | parameters) |
|---|---|
| highMeasureInterval | (To CP) longest time interval among 3 steps measurement interval |
| midMeasureInterval | (To CP) middle length time interval among 3 steps measurement interval |
| lowMeasureInterval | (To CP) shortest length time interval among 3 steps measurement interval |
| gpsAccurcyThreshold | (To CP) threshold of GPS accuracy |
| samplingRAT | What type of base stations to collect data from (LTE/WCDMA/GSM) |

The WiFi module 520 may serve to transmit the collected information to the server 106 based on the policy. For example, the policy in Table 1 may include a report interval such as a maximum report interval maxReportInterval and a minimum report interval minReportInterval. Accordingly, the processor 500 may control the WiFi module 520 to transmit the collected information to the server 106 at the report interval defined in the policy.

In an embodiment of the present disclosure, reporting of the collected information may be made through the WiFi network in consideration of the billing issues associated with the cellular networks. Accordingly, upon arrival of a predetermined report interval, the processor 500 may determine whether WiFi access is possible through the WiFi module 520, and if the WiFi access is possible, the processor 500 may report the collected information through the WiFi module 520. If the WiFi access is unavailable, the processor 500 may wait until the next report interval. Although the WiFi module 520 is assumed to be used for the purpose of reporting the collected information to the server due to the billing issues in an embodiment of the present disclosure, a communication module other than the WiFi module 520 may be used for the purpose of reporting the collected information to the server.

The processor 500 may receive the policy from the server 106 and store the received policy in the memory 515, and may collect the information required to estimate the location of the base station 300 based on the policy. For example, if the base station that the electronic device 101 has now accessed corresponds to target base station information (e.g., targetCell in Table 1) included in the policy, the processor 500 may collect information about the target base station at a collection interval defined in the policy. The processor 500 may increase the priority for the target base station so that the collected information about the target base station must be reported, may define the collection interval as the maximum report interval maxReportInterval to frequently collect information about the target base station, or may maximize the storage period of the information collected for the target base station, and in this way, the processor 500 may obtain more information required to estimate the location of the target base station, thereby increasing the reliability of the result of estimating the location of the target base station. In an embodiment of the present disclosure, it is possible to increase the accuracy of estimating the location of the base station 300 using the time-based parameter such as TA of LTE. Since TA is not a parameter indicating a distance between the electronic device 101 and the base station 300, it is possible to estimate the location of the base station 300 using the rank correlation that is not based on distance.

Upon receiving the TA information from the base station 300 based on the policy, the processor 500 may store the GPS information for the point where the TA information is received, in the memory 515. The processor 500 may store information about the base station 300, which includes TA information, together with the location information of the electronic device 101, which is obtained through the GPS module 510. Accordingly, the location information of the electronic device 101 may be information about the point where the TA information is collected.

The processor 500 may report the collected information to the server 106 based on the policy. The collected information may include the location information (e.g., information about the point where the TA information is collected) of the electronic device 101 and the base station 300 information including the TA information. The processor 500 may store the collected information in the memory 515 until the report interval defined in the policy, and may report the stored information to the server 106 during the next report interval. In an embodiment of the present disclosure, the processor 500 may transmit all of the stored information to the server 106 based on the policy, or may transmit some of the stored information to the server 106. The processor 500 may filter the collected information to be transmitted to the server 106 depending on the policy, and transmit the filtered information.

The processor 500 may determine whether the location information is location information having a higher accuracy than a threshold included in the policy, and if the location information has a higher accuracy than the threshold, the processor 500 may transmit the collected information including the location information through the WiFi module 520.

The server 106 includes components for estimating the location of the base station 300 based on the collected information provided from the electronic device 101. The server 106 includes at least one of a processor 530, a policy controller 535, a grid database 545, and a cell database 550.

The policy controller 535 of the server 106 may serve to provide a policy as a criterion for collecting the information required to estimate the location of the base station 300 in the electronic device 101. All or some operations of the policy controller 535 may be implemented in the processor 530. The processor 530 may perform at least one of the operations that are performed by the policy controller 535.

Figure 6:
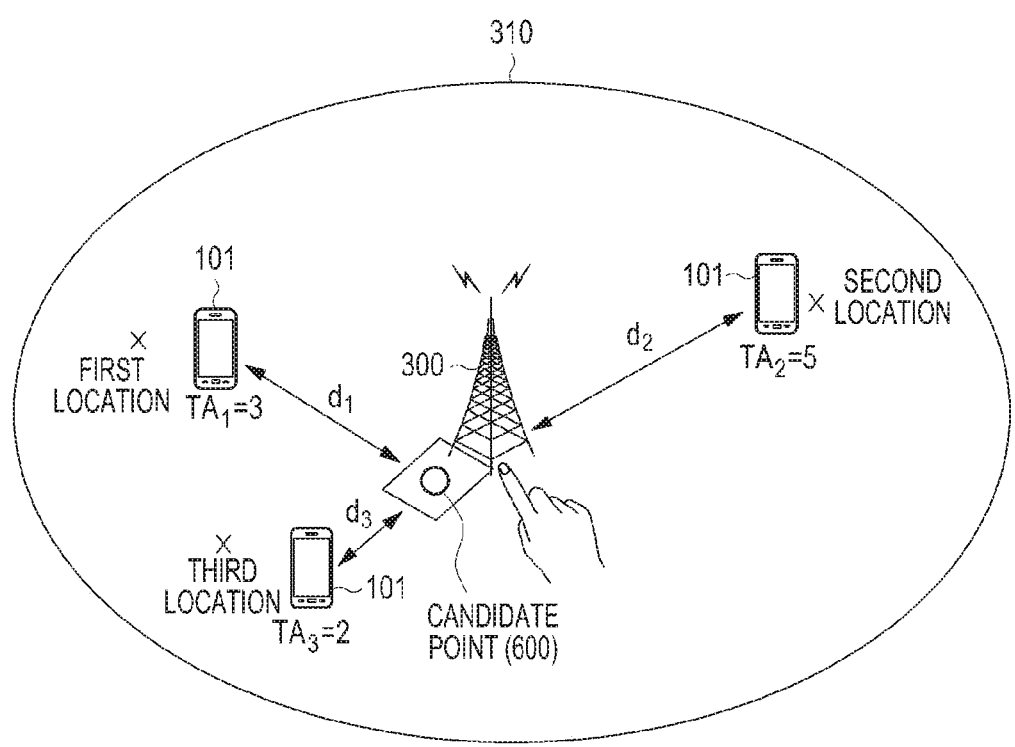
FIG. 6 illustrates a method for estimating the location of a base station based on the collected information in an electronic device according to an embodiment of the present disclosure.

The processor 530 may estimate the location of the base station 300 and store the location in the cell database 550, based on the collected information provided from the electronic device 101. The location (i.e., the coordinates) of the base station 300 may be used as a reference location for the electronic device 101. Reference will be made to FIG. 6 to describe a method for estimating the location of the base station 300. FIG. 6 illustrates a method for estimating the location of a base station based on the collected information in an electronic device according to an embodiment of the present disclosure.

Referring to FIG. 6, it can be assumed that the electronic device 101 has collected information with $TA_1=3$ from the base station 300 in a first location, has collected information with $TA_2=5$ in a second location, and has collected information with $TA_3=2$ in a third location. Since the TA information collected in each location is information that is proportional to the distance from the base station 300, it can be noted that among a distance $d_1$ from the base station 300 in the first location, a distance $d_2$ from the base station 300 in the second location, and a distance $d_3$ from the base station 300 in the third location, the distance $d_2$ corresponds to the longest distance and the distance $d_3$ corresponds to the shortest distance. Therefore, based on the collected TA information of $TA_1=3$, $TA_2=5$ and $TA_3=2$, the processor 530 may predict that the base station 300 will exist in a candidate point 600, which is the farthest location from the second location and the nearest location from the third location.

Figure 7:
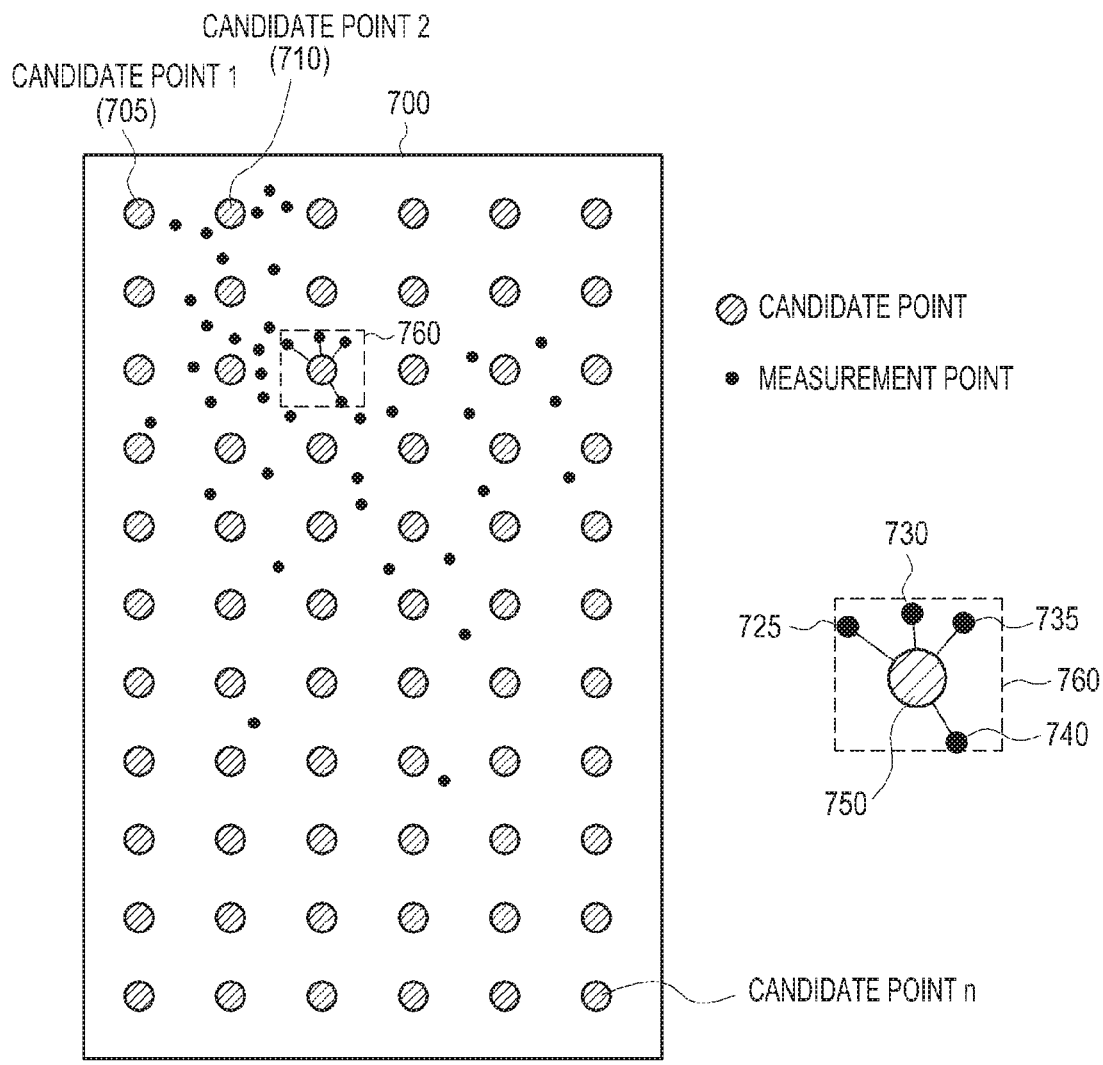
FIG. 7 illustrates the relationship between the grid representing candidate points and the measurement points according to an embodiment of the present disclosure.

Reference will be made to FIG. 7 to describe a method for determining the coordinates of the base station 300 from least one of a plurality of candidate points where it is predicted that the base station 300 will exist, according to an embodiment of the present disclosure. FIG. 7 illustrates a relationship between the grid representing candidate points and the measurement points according to an embodiment of the present disclosure.

Referring to FIG. 7, the processor 530 may quantize measurement points that the electronic device 101 has obtained through the GPS module 510, in the grid that is configured in a zone 700 (e.g., at a predetermined interval) of a predetermined size. A plurality of candidate points (e.g., n candidate points) may be set in the zone 700, and the candidate points such as a first candidate point 705 and a second candidate point 710 may be disposed at regular intervals. The candidate point may be referred to as a grid point.

In the case where location information (i.e., measurement points) of the electronic device 101 is densely disposed around a certain candidate point 750, it is possible to quantize measurement points 725, 730, 735 and 740 in a zone 760 of a predetermined size around the candidate point 750. To this end, the server 106 may further include a quantization unit 540.

In the case where at least a predetermined number of measurement points are distributed around the certain candidate point 750, the quantization unit 540 may accumulate values of the measurement points 725, 730, 735 and 740, and then calculate an average thereof. The information that is quantized for the nearest candidate point on the latitude and longitude coordinates at the measurement points may be reflected in calculating an average of the information stored for the candidate point. The calculated average measurement point may be mapped to the candidate point 750 and stored in the grid database 545 by the quantization unit 540. By quantizing the measurement points that are densely disposed around a candidate point, it is possible to reduce the processing load in the server 106, efficiently manage the data storage capacity, and minimize the effect of the measurement error which may occur during the measurement in the electronic device 101.

The processor 530 may estimate the location of the base station 300 based on the grid points stored in the grid database 545. Specifically, the processor 530 may calculate any one candidate point where it is predicted that the base station 300 will exist, among a plurality of candidate points in the grid, thereby determining the calculated candidate point as the coordinates of the base station 300. The processor 530 may gather the measurement points to calculate a distance between the candidate points where it is predicted that the base station 300 will exist, and the measurement points. Subsequently, the processor 530 may calculate a correlation between the calculated distance and the TA value. Further, a correlation between the calculated distance and the location information (e.g., RSRP value) in the electronic device 101 may also be calculated to increase the accuracy in estimating the location of the base station 300. Therefore, the location of the base station 300 may be determined based on the correlation for the candidate points.

Figure 8:
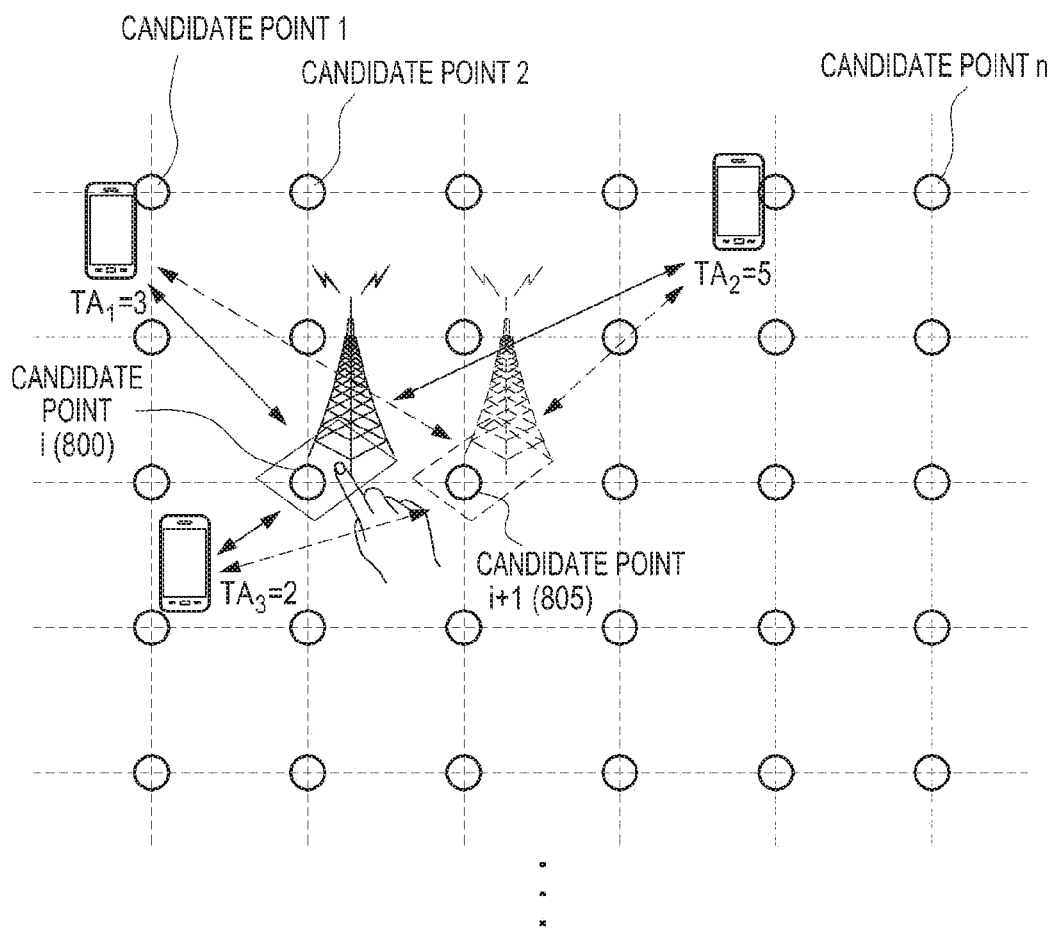
FIG. 8 illustrates a method for estimating the location of a base station in the grid according to an embodiment of the present disclosure.

FIG. 8 illustrates a method for estimating the location of a base station in the grid according to an embodiment of the present disclosure.

As shown in FIG. 8, when the location of the base station 300 is determined based on each TA value in each collection location, the location with the smallest TA may correspond to the shortest distance from the base station 300 and the location with the largest TA may correspond to the longest distance from the base station 300. Therefore, the processor 530 may determine whether each candidate point such as point # i 800 and a candidate point # (i+1) 805 is a point that maximizes the correlation between TA and the distance.

In an embodiment of the present disclosure, the processor 530 may estimate a candidate point with the maximum rank correlation coefficient between the TA and the distance, as the location of the base station 300 based on Equation (1) below.

$$\max_{i} 1 - \frac{\sum_{i} |\text{rank}(d_i(l)) - \text{rank}(TA_i)|^2}{n(n^2-1)/6} \quad (1)$$

where l denotes a location index, n denotes the number of measurement points, $d_i(l)$ denotes the Euclidean distance between the location l and the measurement point i, and rank($x_i$) denotes a rank variable of 1, 2, . . . , n.

Reference will be made to FIG. 9 to describe Equation (1) in detail. FIG. 9 illustrates the correlation between candidate points for each measurement location according to an embodiment of the present disclosure.

Referring to FIG. 9, in response to the order of the distance between a candidate point # i and each location such as a first location, a second location and a third location, since the distance between the third location and the candidate point # i is shortest, the rank in the third location may be 1, and since the distance between the second location and the candidate point # i is longest, the rank in the second location may be 3. Accordingly, the rank in the first location may be 2. In this way, for the candidate point # (i+1), the rank in the first location may be 3, the rank in the second location may be 2, and the rank in the third location may be 1.

Since $TA_3=2$ in the third location, the rank may be 1. Since $TA_2=5$ in the second location, the rank may be 3. Since $TA_1=3$ in the first location, the rank may be 2. In the case where the rank values for the candidate point # i are substituted in Equation (1), the resulting value of Equation (1) may be 1. Therefore, if a rank difference between each location and the candidate points is calculated, it means that the correlation between two ranks is higher as the rank difference is closer to 1. As a result, according to an embodiment of the present disclosure, the candidate point that maximizes the resulting value of Equation (1) may be determined as the location of the base station 300.

The processor 530 may store the location (i.e., cell coordinates) of the base station 300 in the cell database 550. In this way, the processor 530 may estimate the locations of a plurality of base stations based on the information collected for each base station 300 that the electronic device 101 has accessed, to build the cell database 550 for the locations of the base stations.

Figure 10:
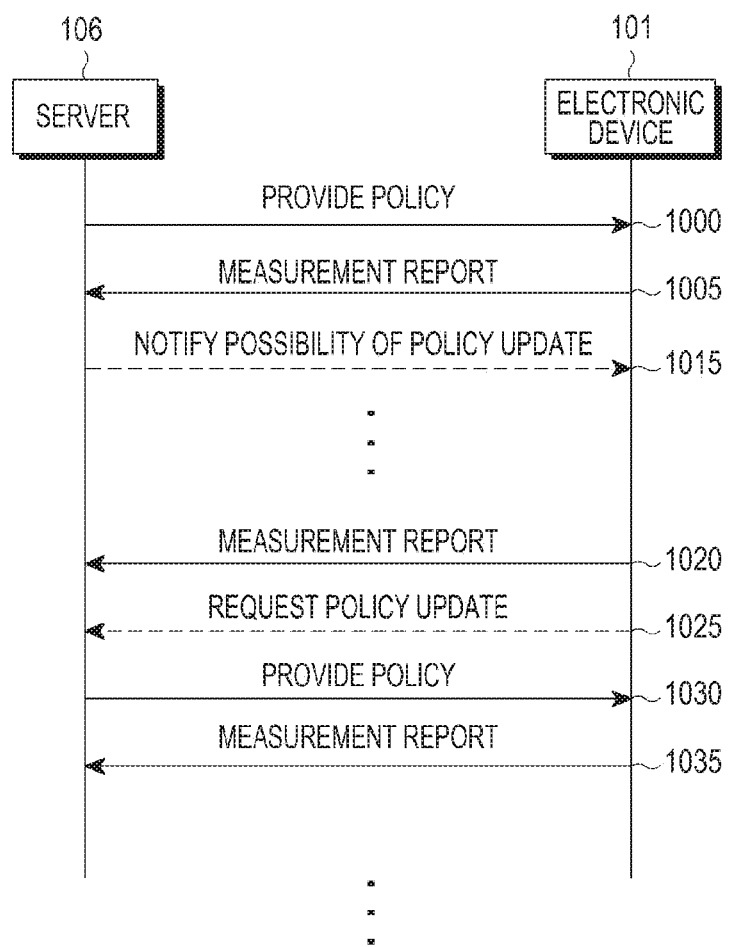
FIG. 10 is a flow diagram illustrating messages exchanged between an electronic device and a server according to an embodiment of the present disclosure.

FIG. 10 is a flow diagram illustrating messages exchanged between an electronic device and a server according to an embodiment of the present disclosure.

Referring to FIG. 10, the server 106 provides a policy that is a criterion for obtaining and reporting the information required to estimate the location of a base station 300 to the electronic device 101 in step 1000. In response, the electronic device 101 transmits a measurement report that includes the information provided from the base station 300 based on the policy and the location information for the point where the base station 300 information is provided, in step 1005. The measurement report may be made at a report interval defined in the policy.

In an embodiment of the present disclosure, since the policy may be updated for the electronic devices being serviced by a specific network operator, the policy stored in the electronic device 101 should also be updated together. Therefore, the server 106 may notify the electronic device 101 that the policy update is possible, in step 1015. The update may be made at the time set by the server 106. The electronic device 101 may perform a measurement report at a report interval defined in the policy in step 1020, and the electronic device 101 may request the policy update at the time the update is needed, in step 1025. In response to the request, the server 106 may provide the updated policy in step 1030, and the electronic device 101 may perform a measurement report based on the updated policy in operation 1035.

Figure 11:
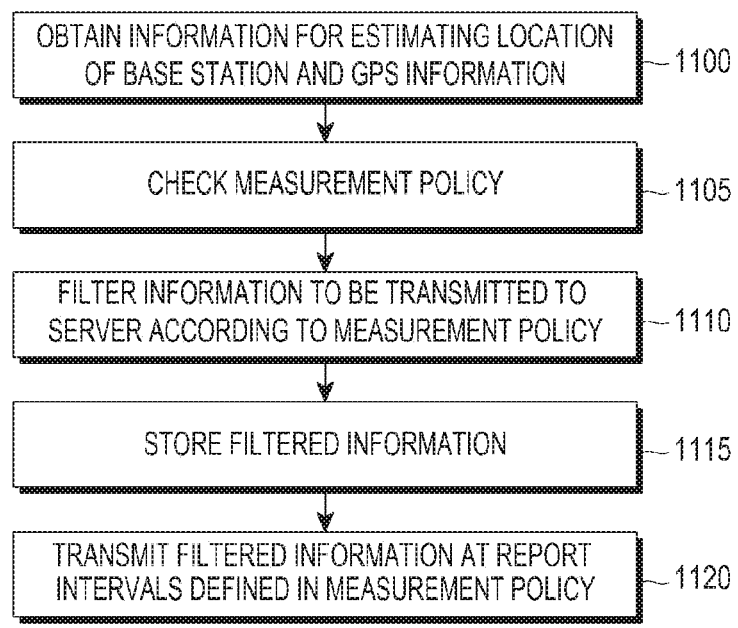
FIG. 11 is a flowchart illustrating a method for collecting information required to estimate the location of a base station according to an embodiment of the present disclosure.

FIG. 11 is a flowchart illustrating a method for collecting information required to estimate the location of a base station according to an embodiment of the present disclosure.

Referring to FIG. 11, the electronic device 101 may obtain base station 300 information and GPS information for estimating the location of a base station 300 in step 1100. The GPS information may represent the location information obtained by collecting information about the base station 300 that the electronic device 101 has accessed, and may include the latitude, the longitude, the altitude and the accuracy. In a particular embodiment, the base station 300 information may include the network information such as base station 300 identification information, and the measurement information such as TA, RSSI and RSRP. Subsequently, the electronic device 101 may check or identify the stored measurement policy in step 1105. In the case where the base station 300 information is for a target base station included in the measurement policy, the electronic device 101 may activate a GPS module to start the collection by obtaining the location information of the measurement point. The policy may also include a collection interval for the target base station. In a particular embodiment, upon obtaining the GPS information at the current location, i.e., upon identifying the current location, the electronic device 101 may obtain base station 300 information from the base station 300.

For the target base station, the collection interval may be minimized to collect more target base station information. The collection interval may be applied differently depending on whether the collected information meets the criteria defined in the policy.

The electronic device 101 may filter the information to be transmitted to the server 106 among the collected information depending on the measurement policy in step 1110. The electronic device 101 may store the filtered information in step 1115, and then transmit the filtered information to the server 106 that estimates the location of the base station 300, at the report interval defined in the measurement policy, in step 1120. The filtered information may include the base station 300 identification information, the TA, and the measurement point where the TA is collected.

Figure 12:
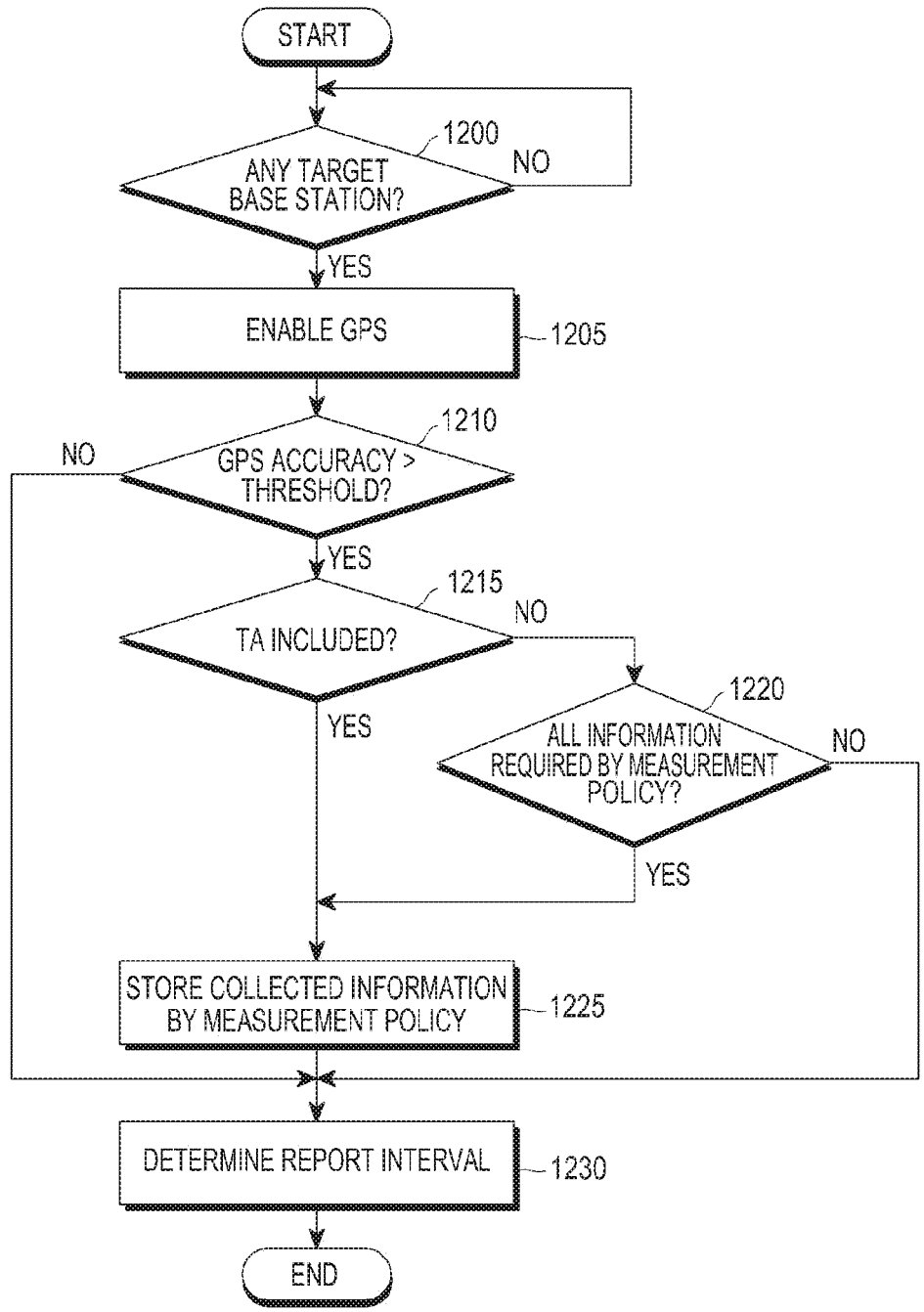
FIG. 12 is a flowchart illustrating a method for collecting information required to estimate the location of a base station in an electronic device according to an embodiment of the present disclosure.

FIG. 12 is a flowchart illustrating a method for collecting information required to estimate the location of a base station in an electronic device according to an embodiment of the present disclosure.

Referring to FIG. 12, the electronic device 101 may monitor the GPS and base station 300 access status based on the criteria for collecting base station 300 information which are defined in the policy. The electronic device 101 may determine in step 1200 whether there is information about a target base station among the base station 300 information received from the base station 300. If there is a target base station (i.e., if there is base station 300 information received from a base station 300 corresponding to the target base station), the electronic device 101 may enable the GPS module in step 1205 to obtain the location information of the point where the target base station information is obtained. Upon receiving the GPS information, the electronic device 101 may determine in step 1210 whether the GPS accuracy is greater than or equal to a threshold defined in the policy. If the GPS accuracy is less than the threshold, the electronic device 101 may discard the collected information without storing the collected information, since the collected information cannot be used for estimating the location of the base station 300, and then wait until the next collection interval to receive GPS information.

When desiring to gather the target base station information, the server 106 may set a target cell in the policy and provide the policy. The server 106 may determine the target base station by specifying an ID or a cell coverage area. In response, if the base station 300 identification information corresponds to the target base station in the policy, the electronic device 101 may start collecting TA information for the target base station. After receiving the TA, if the TA is for the target base station, the electronic device 101 may enable the GPS module to obtain GPS information, or may obtain GPS information, and then determine whether the TA received at the point where the GPS information is obtained, corresponds to the target base station. The order of obtaining the location information of the electronic device 101 and the base station 300 information may not be limited thereto.

If the GPS accuracy is greater than or equal to the threshold in step 1210, the electronic device 101 may determine in step 1215 whether the TA is included. In a particular embodiment, when reporting collected information in the measurement policy, the electronic device 101 may determine whether to include the TA, based on the policy for including and sending the TA.

If including the TA is possible in step 1215 (e.g., if the electronic device 101 should collect information including the TA), the electronic device 101 may collect information including the TA by the measurement policy and store the collected information in step 1225. Since the TA can be obtained only when the electronic device 101 is connected to the target base station, the means of collecting information without including the TA may be performing an operation of collecting the remaining other information except for the TA in the idle mode.

If the measurement policy includes collecting information including the TA in the state where the electronic device 101 is connected to the target base station, the electronic device 101 may not collect and store the collected information in the idle mode, since the electronic device 101 can obtain the TA only when the electronic device 101 is connected to the target base station.

If including the TA is not possible in step 1215 (i.e., the electronic device 101 cannot collect information including the TA), the electronic device 101 may determine in step 1220 whether the measurement policy requires all other information even though the information does not include the TA. An example of the case where the electronic device 101 cannot collect information including the TA may be a case where the electronic device 101 cannot obtain the TA in idle mode in which the electronic device 101 is not connected to the target base station.

If the measurement policy requires collection of all other information even though the information does not include the TA in the idle mode (i.e., if the server 106 requests the electronic device 101 to send all the collected information except for the TA to the server 106), the electronic device 101 may store the collected information by the measurement policy except for the TA in step 1225, and then determine a report interval for transmission of the collected information in step 1230. If it is determined in step 1220 that the measurement policy does not require all other information except for the TA (e.g., if it is not possible to include the TA because of the idle state), the electronic device 101 may not store the collected information except for the TA since the electronic device 101 cannot obtain the TA information from the target base station in the idle mode. In this case, in step 1230, the electronic device 101 may determine the report interval by waiting until the target base station is connected.

In an embodiment of the present disclosure, according to the measurement policy related to whether the TA is included, there may be a case of necessarily collecting information including the TA and a case of collecting the remaining information even though there is no TA. Since the TA can be collected only when the electronic device 101 is connected to the target base station, the case of necessarily collecting information including the TA and the case of collecting the remaining information even though there is no TA may be construed as an operation of determining whether to collect the other information except for the TA even in the idle mode. It is possible to control the collected information depending on the connection/idle state of the electronic device 101.

After determining whether to store the collected information, the electronic device 101 may determine the report interval up to the next step as in step 1230. The report interval may be determined differently depending on the collected information, and may be determined based on the policy. For example, if the target base station information is included in the policy, the electronic device 101 may determine the report interval to be short, in order to collect more target base station information. On the other hand, if the GPS accuracy falls below the threshold, the electronic device 101 may determine the collection interval to be longer, considering that the electronic device 101 is in a location where GPS satellite signals are not well detected. The collection interval may be determined to limit unnecessary collection operations and therefore reduce system resource loading. The report interval may also be determined similarly.

Figure 13:
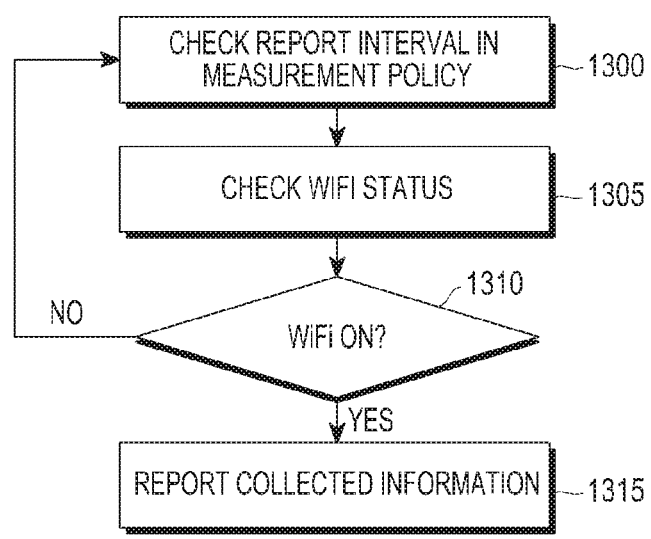
FIG. 13 is a flowchart illustrating a method for determining a report interval of collected information according to an embodiment of the present disclosure.

FIG. 13 is a flowchart illustrating a method for determining a report interval of collected information according to an embodiment of the present disclosure.

Referring to FIG. 13, the electronic device 101 may check or identify the report interval in the measurement policy to report collected information in step 1300. The report interval may also be determined through the policy provided from the server 106. As in Table 1, the minimum report interval minReportInterval may be determined to prevent the server load caused by frequent reporting, and the maximum report interval maxReportInterval may also be determined to prevent the report interval from being too long.

Upon arrival of the report interval, the electronic device 101 may check the WiFi status in step 1305. If the WiFi is turned on in step 1310, the electronic device 101 may report the collected information to the server 106 in step 1315. However, if the WiFi is not turned on in step 1310, the electronic device 101 may return to operation 1300 and check the next report interval. The time that the electronic device 101 transmits the collected information to the server 106 may be determined in various ways such as the time the application is run, the interval defined in the policy, and the time the WiFi is turned on.

As the electronic device 101 transmits the collected information to the server 106, the server 106 may estimate the location of the base station 300 based on the collected information. The coordinates of the base station 300 that manages the cell where the electronic device 101 is located, may be used as a reference location for location estimation by the electronic device 101. In other words, although the coordinates of the base station 300 do not include the geographic location of the electronic device 101, a database storing the coordinates estimated for each base station 300 may be used for the location estimation by the electronic device 101.

The term 'module' as used herein may refer to a unit that includes one of or a combination of hardware, software or firmware. The term 'module' may be interchangeably used with terms such as unit, logic, logical block, component, or circuit. The module may be the minimum unit of an integrally constructed part, or a part thereof. The module may be the minimum unit for performing one or more functions, or a part thereof. The module may be implemented mechanically or electronically. The module may include at least one of an application-specific integrated circuit (ASIC) chip, field-programmable gate arrays (FPGAs), or a programmable-logic device, which are known or will be developed in the future, and which perform certain operations.

It will be appreciated that an embodiment of the present disclosure may be implemented by hardware, software or a combination thereof. The software may be stored in a volatile or non-volatile storage device (e.g., an erasable/rewritable read only memory (ROM)), a memory (e.g., a random access memory (RAM), a memory chip, and a memory device or integrated circuit (IC)), or an optically or magnetically writable machine (or computer)-readable storage medium (e.g., compact disc (CD), digital versatile disc (DVD), magnetic disc, or magnetic tape). The memory that can be included in the electronic device may be an example of the machine-readable storage medium suitable for storing the program or programs including the instructions to implement embodiments of the present disclosure. Therefore, the present disclosure may include a program including code for implementing the device or method as set forth in the appended claims, and a machine-readable storage medium storing the program. Further, the program may be electronically transferred through any media such as communication signals that are transmitted through the wired/wireless connections.

The electronic device may receive or download the program from a program server to which the electronic device is connected by wire or wirelessly. The program server may include a memory for storing a program including instructions to implement the location estimation method and storing the information required for the location estimation method, a communication unit for performing wired/wireless communication with the electronic device, and a controller for transmitting the program to the electronic device automatically or upon request of the electronic device.

As is apparent from the foregoing description, according to an embodiment of the present disclosure, the technique for estimating the location of a base station may be provided as a method for positioning determination of the electronic device.

Further, according to an embodiment of the present disclosure, it is possible to overcome the problems caused by the reception performance or the reception environment by estimating the location of the base station using the timing advance (TA).

According to an embodiment of the present disclosure, the electronic device may collect information that is proportional to the distance from the base station, and transmit the information collected from the base station to the server so that the collected information may be used to estimate the location of the base station. The location of the base station, which is estimated by the server, may be used for positioning of the electronic device, or provision of location based services.

According to an embodiment of the present disclosure, the server may manage the geographic location information of the base station that manages the cells in the cellular network, so that the server may use the location of the base station as a reference location, making it possible to increase the accuracy during the positioning of the electronic device.

While the disclosure has been shown and described with reference to certain particular embodiments thereof, it will be understood by those skilled in the art that various changes in form and details may be made therein without departing from the spirit and scope of the disclosure as defined by the appended claims and their equivalents.

What is claimed is:

1. A method for estimating a location of an external electronic device in communication with an electronic device, the method comprising:
   receiving, from a server, a policy for collecting external electronic device information, wherein the policy includes a predetermined time interval at which the electronic device reports the external electronic device information to the server;
   collecting the external electronic device information from the external electronic device, wherein the external electronic device information includes time information that is proportional to a distance between the electronic device and the external electronic device communicating with the electronic device;
   obtaining location information of the electronic device for each location where the external electronic device information is collected;
   identifying the predetermined time interval included in the policy; and
   transmitting the external electronic device information and the location information to the server to be used to estimate the location of the external electronic device at the predetermined time interval, based on the policy.

2. The method of claim 1, wherein the time information includes timing advance and the external electronic device includes at least one of a base station or access point.

3. The method of claim 1, wherein the policy further includes at least one criterion for reporting the external electronic device information to the server.

4. The method of claim 3, further comprising transmitting at least a part of the external electronic device information corresponding to the policy among the collected external electronic device information.

5. The method of claim 3, wherein transmitting the external electronic device information and the location information comprises transmitting the external electronic device information and the location information of the electronic device at the predetermined time interval corresponding to the criterion for reporting, which is included in the policy.

6. The method of claim 3, wherein collecting the external electronic device information comprises collecting the external electronic device information at a measurement interval included in the policy, if the external electronic device corresponds to target external electronic device information included in the policy.

7. The method of claim 3, wherein the location information is location information having a higher accuracy than a threshold included in the policy.

8. The method of claim 1, wherein the external electronic device information further includes at least one of an identifier (ID) of the external electronic device, a received signal strength indicator (RSSI) and a reference signal received power (RSRP).

9. The method of claim 1, wherein the location information includes at least one of global positioning system (GPS) information and a GPS accuracy.

10. A method for estimating location of an external electronic device in a server, the method comprising:
  transmitting a policy for collecting external electronic device information to an electronic device, wherein the policy includes a predetermined time interval at which the electronic device reports the external electronic device information to the server;
  receiving, from the electronic device, the external electronic device information and location information of the electronic device at the predetermined time interval, the external electronic device information including time information that is proportional to a distance between the electronic device and the external electronic device communicating with the electronic device, wherein the location information is for each location where the external electronic device information is collected; and
  estimating the location of the external electronic device based on the time information and the location information.

11. The method of claim 10, wherein the time information includes timing advance and the external electronic device includes at least one of a base station or access point.

12. The method of claim 10, wherein estimating the location of the external electronic device comprises:
  calculating a distance between the location where the external electronic device information is collected, and each of a plurality of candidate locations of the external electronic device, based on the location information;
  calculating a correlation between the calculated distance and the time information; and
  determining one of the plurality of candidate locations as the location of the external electronic device based on the correlation.

13. The method of claim 10, wherein the policy further includes a criterion for reporting the external electronic device information.

14. The method of claim 13, wherein the policy includes at least one of target external electronic device information and an accuracy threshold of the location information.

15. The method of claim 14, wherein the external electronic device information further includes at least one of an identifier (ID) of the external electronic device, a received signal strength indicator (RSSI) and a reference signal received power (RSRP), and wherein the external electronic device information is filtered by the policy.

16. The method of claim 10, wherein the location information includes at least one of global positioning system (GPS) information and a GPS accuracy.

17. An electronic device comprising:
a communication unit;
a memory; and
a processor configured to:
  control the communication unit to communicate with an external electronic device;
  control the communication unit to receive a policy for collecting external electronic device information from a server, wherein the policy includes a predetermined time interval at which the electronic device reports the external electronic device information to the server;
  control the communication unit to collect the external electronic device information from the external electronic device, wherein the external electronic device information includes time information that is proportional to a distance between the electronic device and the external electronic device;
  obtaining location information of the electronic device for each location where the external electronic device information is collected;
  identify the predetermined time interval included in the policy; and
  transmit the external electronic device information and the location information to the server to be used to estimate the location of the external electronic device at the predetermined time interval, based on the policy,
wherein the memory is configured to store the policy.

18. The electronic device of claim 17, further comprising a short-range communication module configured to transmit the external electronic device information and the location information to the server.

19. The electronic device of claim 17, wherein the time information includes timing advance and the external electronic device includes at least one of a base station or access point.

20. The electronic device of claim 17, wherein the processor is configured to transmit at least a part of the external electronic device information corresponding to the policy among the collected external electronic device information.

21. The electronic device of claim 17, wherein the policy includes at least one of target external electronic device information and an accuracy threshold of the location information.

22. The electronic device of claim 21, wherein the location information is location information having a higher accuracy than an accuracy threshold of the location information, which is included in the policy.

23. The electronic device of claim 21, wherein the processor is configured to collect the external electronic device information at a measurement interval included in the policy, if the external electronic device corresponds to the target external electronic device information included in the policy.

24. The electronic device of claim 17, wherein the external electronic device information further includes at least one of an identifier (ID) of the external electronic device, a received signal strength indicator (RSSI) and a reference signal received power (RSRP).

\* \* \* \* \*